United States Patent
Lin

(10) Patent No.: US 8,105,456 B2
(45) Date of Patent: Jan. 31, 2012

(54) METHOD OF MAKING A BREATHABLE FILM LAMINATE AND A BREATHABLE FILM LAMINATE PRODUCED THEREFROM

(76) Inventor: Keng-Hsien Lin, Kaohsiung (TW)

(*) Notice: Subject to any disclaimer, the term of this patent is extended or adjusted under 35 U.S.C. 154(b) by 202 days.

(21) Appl. No.: 12/368,879

(22) Filed: Feb. 10, 2009

(65) Prior Publication Data

US 2010/0203319 A1    Aug. 12, 2010

(51) Int. Cl.
| | |
|---|---|
| B29C 65/02 | (2006.01) |
| B29C 65/70 | (2006.01) |
| B32B 5/22 | (2006.01) |
| B32B 37/06 | (2006.01) |
| B32B 37/08 | (2006.01) |
| B32B 37/14 | (2006.01) |
| B32B 37/24 | (2006.01) |
| B32B 37/26 | (2006.01) |
| B32B 37/10 | (2006.01) |
| B32B 38/10 | (2006.01) |
| B32B 3/00 | (2006.01) |
| B29C 65/18 | (2006.01) |
| B29C 65/38 | (2006.01) |

(52) U.S. Cl. .......... 156/235; 156/77; 156/247; 156/249; 156/289

(58) Field of Classification Search .................. 156/77, 156/230, 235, 247, 249, 289
See application file for complete search history.

(56) References Cited

U.S. PATENT DOCUMENTS

| | | | | |
|---|---|---|---|---|
| 3,562,043 A | * | 2/1971 | Eddy | 156/79 |
| 3,650,880 A | * | 3/1972 | Tieniber | 442/76 |
| 3,793,102 A | * | 2/1974 | Day | 156/78 |
| 4,890,763 A | * | 1/1990 | Curiel | 229/102 |
| 5,370,759 A | * | 12/1994 | Hakotani et al. | 156/73.1 |
| 5,674,600 A | * | 10/1997 | Hargarter et al. | 428/212 |
| 6,645,102 B2 | * | 11/2003 | Kumakura | 474/111 |

* cited by examiner

*Primary Examiner* — Sonya Mazumdar

(74) *Attorney, Agent, or Firm* — Kilpatrick Townsend & Stockton LLP

(57) ABSTRACT

A method of making a breathable film laminate includes: (a) providing a TPU film; (b) applying to a release substrate a layer of a film-formable liquid composition containing a volatile component; (c) heating the liquid composition on the release substrate to expel the volatile component, thereby forming a porous film; (d) transferring the porous film to a surface of the TPU film from the release substrate and pressing the porous film against the TPU film while the porous film is hot, thereby bonding thermally the porous film to the TPU film; and (e) cooling the porous film.

12 Claims, 6 Drawing Sheets

METHOD OF MAKING A BREATHABLE FILM LAMINATE AND A BREATHABLE FILM LAMINATE PRODUCED THEREFROM

BACKGROUND OF THE INVENTION

1. Field of the Invention

This invention relates to a method of making a breathable film laminate, more particularly to a method of making a breathable film laminate including a breathable TPU film.

2. Description of the Related Art

A conventional breathable film made of thermoplastic polyurethane (TPU) that is hydrophilic and that has liquid-impermeable and vapor-permeable properties, generally encounters a problem of swelling upon contact with water. Thus, when the thickness of the thermoplastic polyurethane film is small, the film is likely to form wrinkles which are undesirable for the appearance of the film. When the thickness of the thermoplastic polyurethane film is increased, although the wrinkle problem can be alleviated, the vapor-permeability of TPU will be reduced.

An improvement over the TPU breathable film provides a laminate that includes a thermoplastic polyurethane film having two opposite sides bonded to two fabric layers through an adhesive, thereby reducing the wrinkle problem of the thermoplastic polyurethane film. However, liquid impermeability and vapor permeability become low due to the use of the adhesive, and the cost of materials increases due to the use of the fabric layers.

SUMMARY OF THE INVENTION

Therefore, an object of the present invention is to provide a method of making a breathable film laminate that can overcome the aforesaid drawbacks associated with the prior art.

Another object of this invention is to provide a breathable film laminate produced by the method.

According to one aspect of the present invention, a method of making a breathable film laminate comprises: (a) providing a first TPU film; (b) applying to a first release substrate a layer of a film-formable liquid composition containing a volatile component; (c) heating the liquid composition on the first release substrate to expel the volatile component, thereby forming a first porous film having a multiplicity of micropores on the first release substrate; (d) transferring the first porous film to a first surface of the first TPU film from the first release substrate and pressing the first porous film against the first TPU film while the first porous film is hot, thereby bonding thermally the first porous film to the first TPU film; and (e) cooling the first porous film.

According to another aspect of the present invention, a breathable film laminate made by the aforesaid method comprises: at least one TPU film; and at least one porous layer thermally bonded to the TPU layer and made from a polymer that is selected from the group consisting of polyurethane, and an acrylic polymer.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
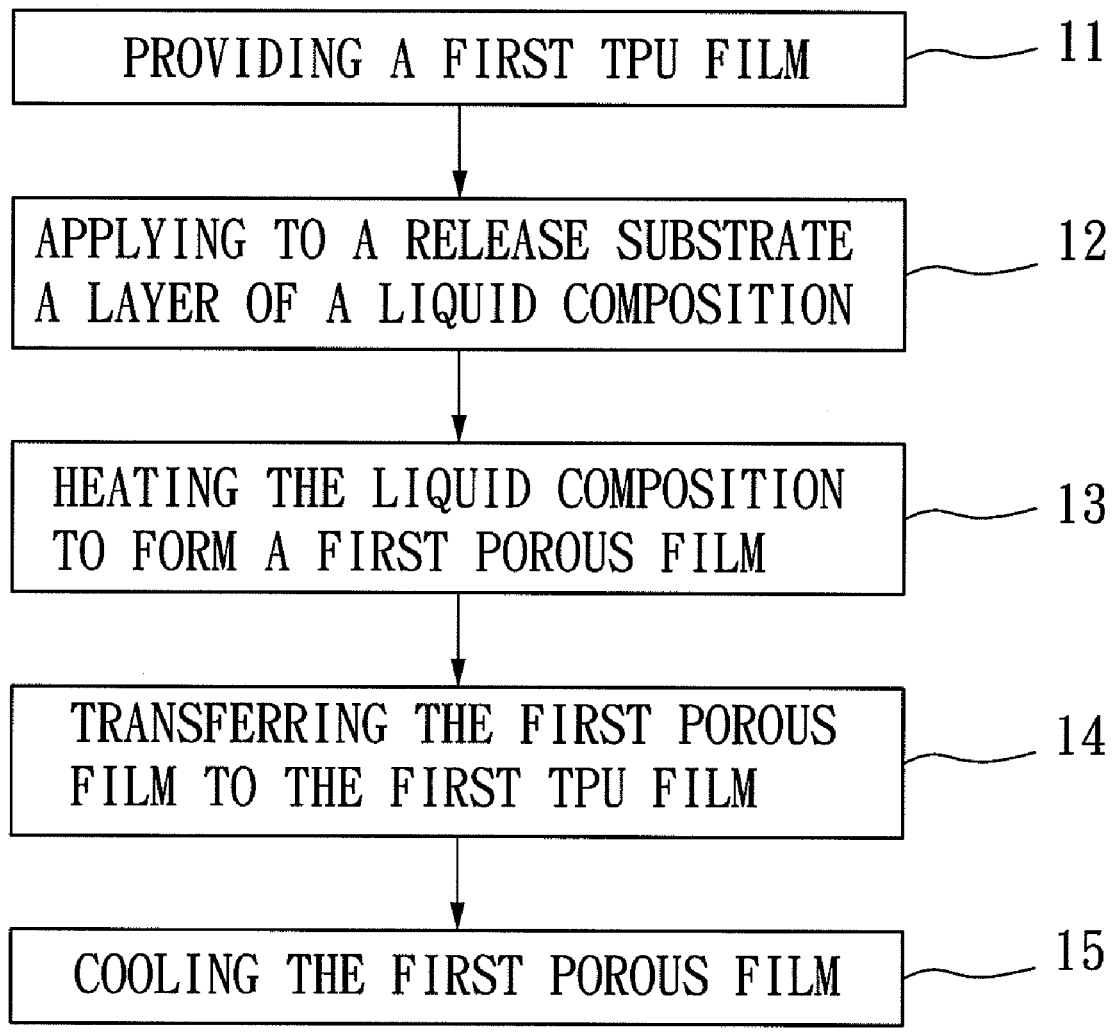
FIG. 1 is a flowchart illustrating the first preferred embodiment of a method for making a breathable film laminate according to this invention.

Before the present invention is described in greater detail with reference to the accompanying preferred embodiments, it should be noted herein that like elements are denoted by the same reference numerals throughout the disclosure.

Figure 2:
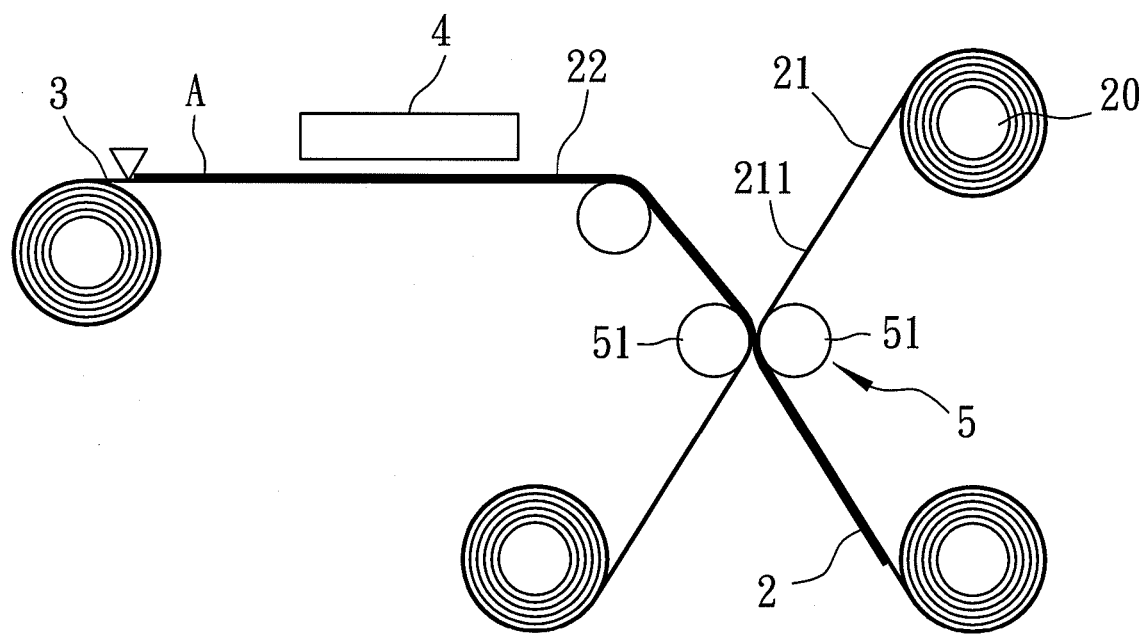
FIG. 2 is a schematic view of an apparatus used in the first preferred embodiment.
Figure 3:
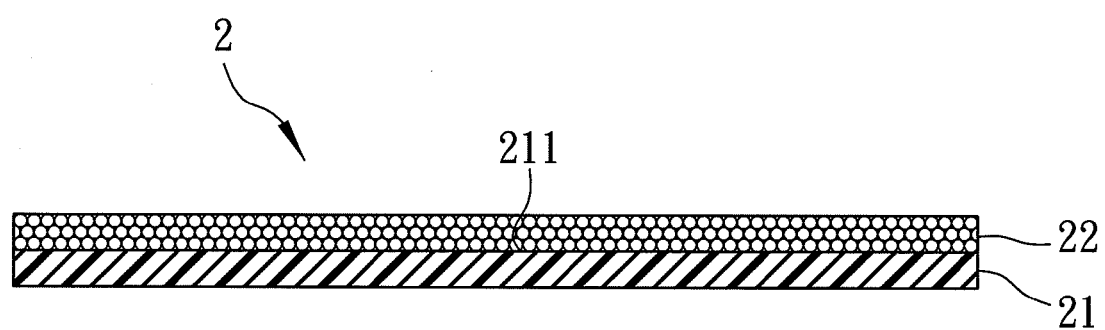
FIG. 3 is a sectional view of a breathable film laminate made by the first preferred embodiment.

Referring to FIGS. 1 to 3, a method of making a breathable film laminate 2 according to the first preferred embodiment of the invention includes steps 11 to 15.

In step 11, a first TPU film 21 is wound around a roller 20 and is advanced to a roller pressing device 5.

In step 12, a layer of film-formable liquid composition (A) is applied to a continuous first release substrate 3. The liquid composition (A) contains a film-formable resin in admixture with a volatile component, and is applied to the first release substrate 3 using a coating device.

The film-formable resin may be any suitable resin. In the preferred embodiments, the film-formable resin is polyurethane or an acrylic polymer. The volatile component may be a suitable solvent that can leave micropores in the resin when volatilized from the resin. In this embodiment, the volatile component is selected from methyl ethyl ketone, ethyl acetate, water, and combinations thereof.

In step 13, the liquid composition A on the first release substrate 3 is heated using an oven 4 so as to expel the volatile component, thereby forming a first porous film 22 having a multiplicity of micropores on the first release substrate 3. The first release substrate 3 with the first porous film 22 is advanced to the roller pressing device 5.

In step 14, the first release substrate 3 and the first porous film 22 are pressed against the first TPU film 21 when they are passed between two rollers 51 of the roller pressing device 5 so that the first porous film 22 is transferred to a first surface 211 of the first TPU film 21 from the first release substrate 3. As the first porous film 22 is still hot when pressed between the rollers 51, it is bonded thermally to the first surface 211 of the first TPU film 21.

The first release substrate 3 may be a release paper. Preferably the first release substrate 3 includes polyethylene terephthalate that facilitates separation of the first porous film 22 from the first release substrate 3. Alternatively, the first release substrate 3 may include polypropylene or polyethylene.

In step 15, the first porous film 22 is cooled, thereby obtaining the breathable film laminate 2, as best shown in FIG. 3.

The breathable film laminate 2 as formed by the method according to the present invention includes the TPU film 21 and the porous film 22. Because both of the TPU film 21 and the porous film 22 have a relatively small thickness, the overall thickness of the breathable film laminate 2 generally ranges from 10 μm to 30 μm. Thus, the overall thickness of the breathable film laminate 2 is not large.

In addition, compared to the two fabric layers bonded adhesively to the TPU film in the conventional laminate, the porous film 22 thermally bonded to the TPU film 21 in the present invention does not reduce vapor permeability of the TPU film 21. The porous film 22 not only can prevent formation of wrinkles in the TPU film 21 but also enhance the strength of the breathable film laminate 2.

Porous plastic films are generally less resistant to water pressure. In the present invention, since the porous film 22 is bonded to the TPU film 21 having high resistance to water pressure even when having a small thickness, the breathable film laminate 2 can bear a water pressure of more than 10000 mm H₂O without the need to increase in thickness.

Figure 4:
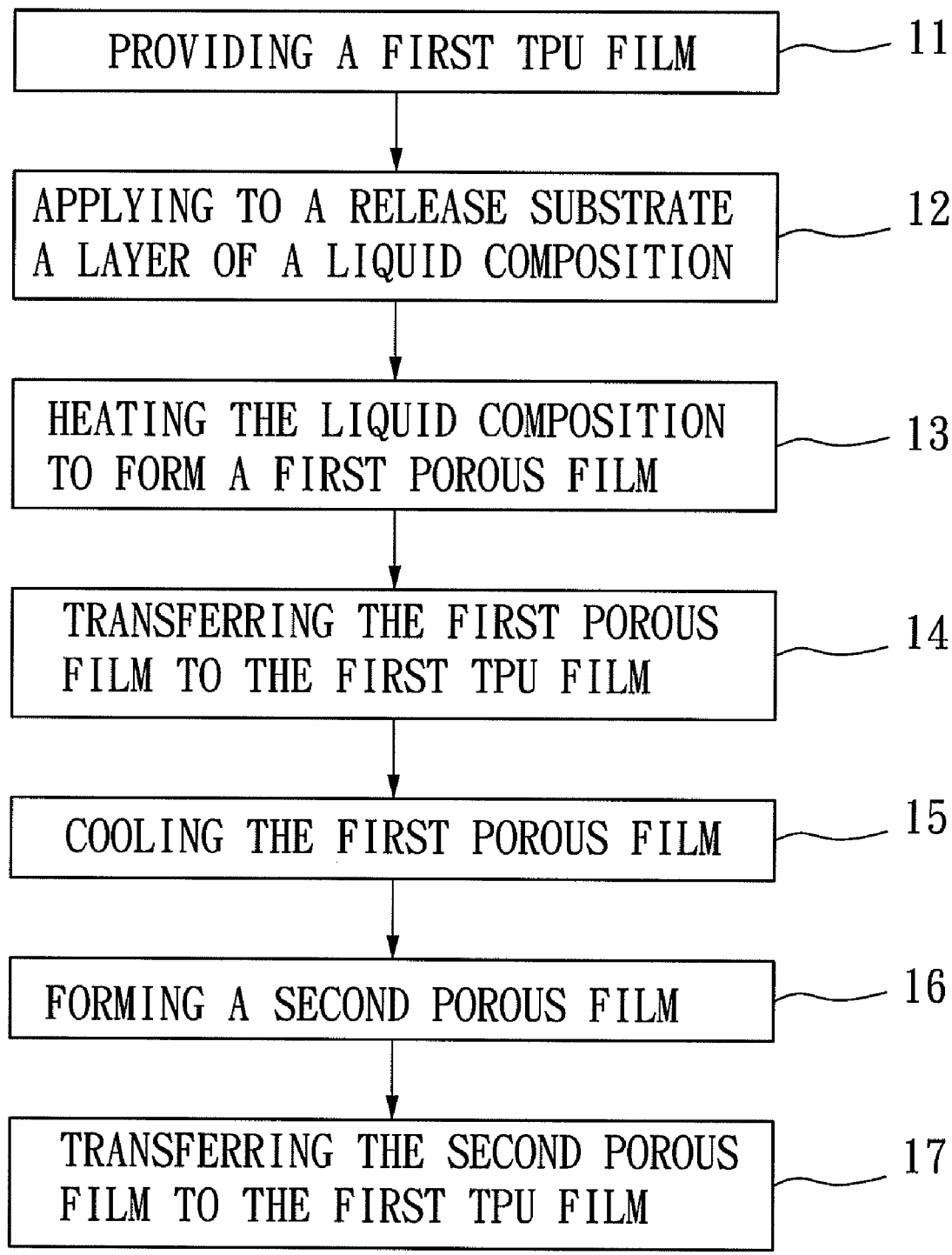
FIG. 4 is a flowchart illustrating the second preferred embodiment of the method for making a breathable film laminate according to this invention.
Figure 5:
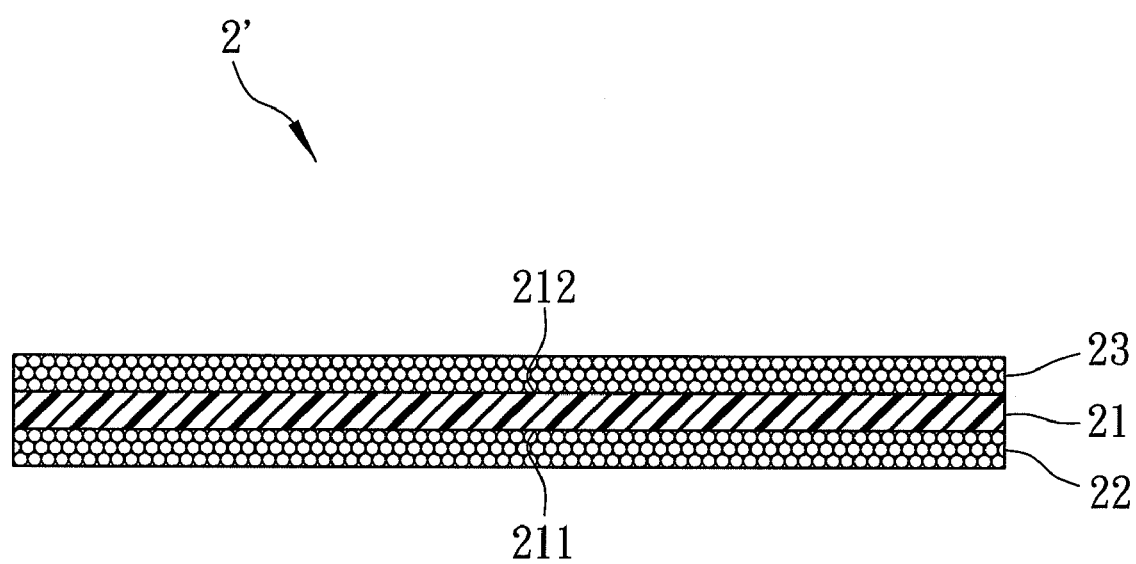
FIG. 5 is a sectional view of a breathable film laminate made by the second preferred embodiment.

FIGS. 4 and 5 illustrate the second preferred embodiment of the method of making a breathable film laminate 2' according to the present invention. The second preferred embodiment differs from the first embodiment in that the second preferred embodiment further includes forming a second porous film 23 on a second release substrate (not shown) under heat (step 16); and transferring the second porous film 23 to a second surface 212 of the first TPU film 21 from the second release substrate and pressing the second porous film 23 against the first TPU film 21 so that the second porous film 23 is thermally bonded to the first TPU film 21 (step 17). The second porous film 23 may be formed and bonded thermally to the first TPU film 21 using the apparatus shown in FIG. 2. Alternatively, the second porous film 23 may be formed using any other suitable apparatus.

The breathable film laminate 2' thus formed has the first TPU film 21 sandwiched between the first and second porous films 22, 23 (see FIG. 5).

Figure 6:
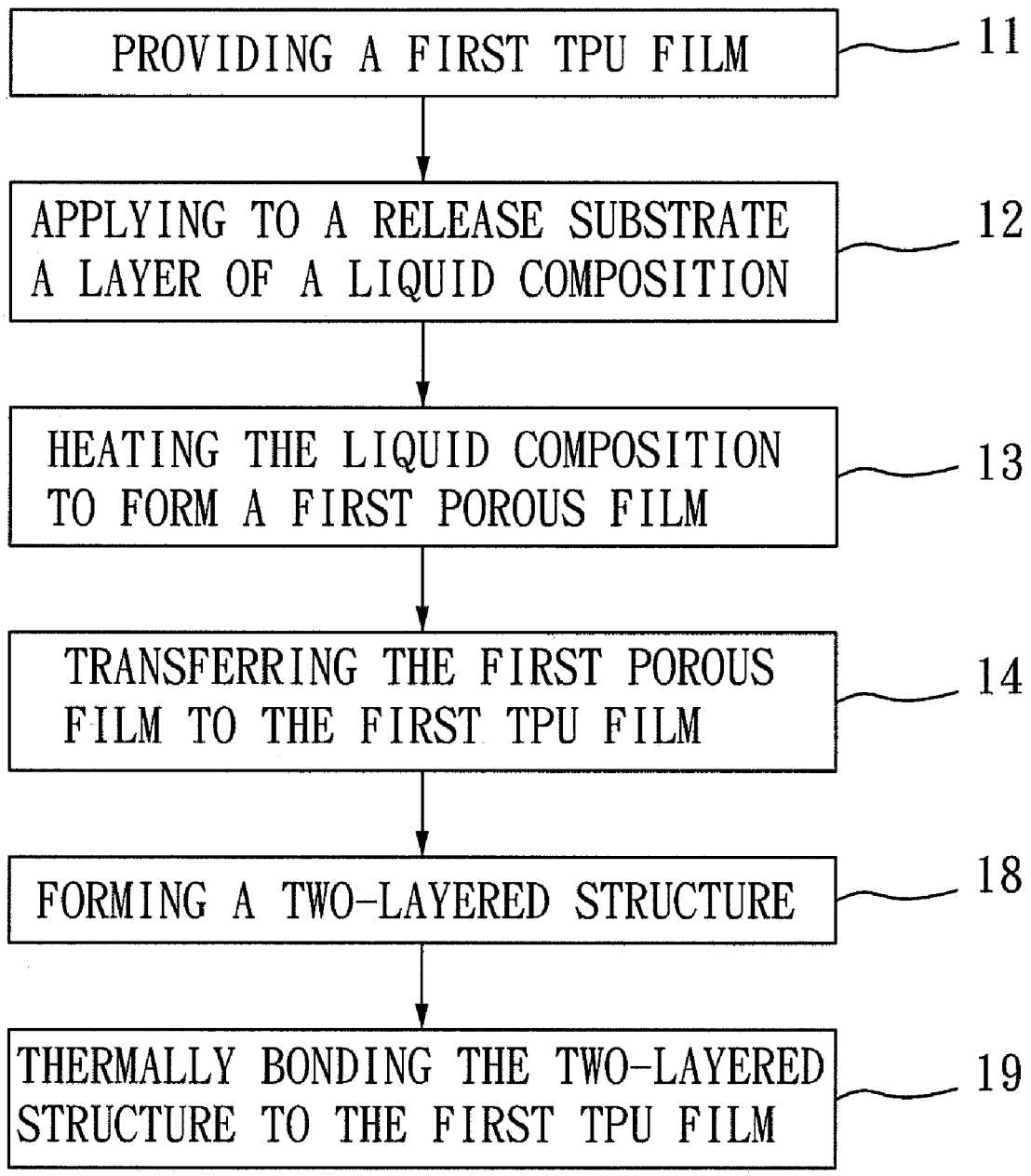
FIG. 6 is a flowchart illustrating the third preferred embodiment of the method for making a breathable film laminate according to this invention.
Figure 7:
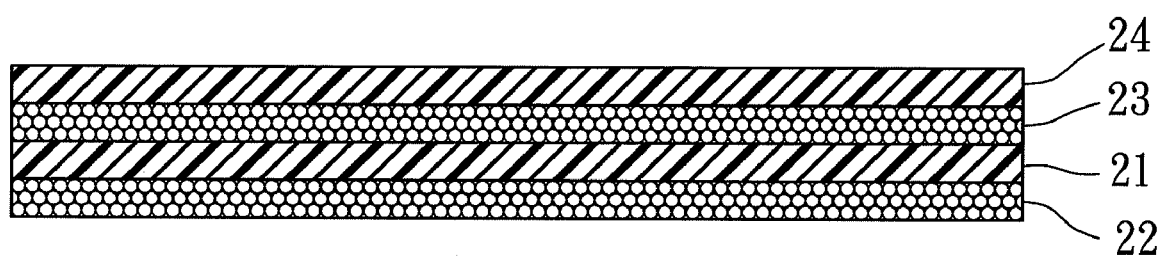
FIG. 7 is a sectional view of a breathable laminate made by the third preferred embodiment.

FIGS. 6 and 7 illustrate the third preferred embodiment of the method of making a breathable film laminate 2" according to the present invention. The third preferred embodiment differs from the first embodiment in that the third preferred embodiment further includes forming a two-layered structure having a second TPU film 24 and a second porous film 23 (step 18), and thermally bonding the second porous film 23 of the two-layered structure to the first TPU film 21 (step 19). The two-layered structure may be formed using the apparatus shown in FIG. 2 or any other suitable apparatus. Also, the thermally bonding step may be carried out using the apparatus shown in FIG. 2 or any other suitable apparatus. The breathable film laminate 2" thus formed has the first and second TPU film 21, 24, and the first and second porous films 22, 23, which are alternately disposed (see FIG. 8).

It is noted that the number of the TPU film 21 and the porous film 22 may be varied depending on actual requirements. If a small thickness is desirable, the breathable film laminate 2' having the first TPU film 21 sandwiched between the first and second porous films 22, 23, as shown in FIG. 5, is preferable. In case a stronger structure is necessary, the breathable film laminate 2" additionally having the second TPU film 24 as shown in FIG. 7 may be used.

With the invention thus explained, it is apparent that various modifications and variations can be made without departing from the spirit of the present invention. It is therefore intended that the invention be limited only as recited in the appended claims.

What is claimed is:

1. A method of making a breathable film laminate comprising:
   (a) providing a first thermoplastic polyurethane film;
   (b) applying to a first release substrate a layer of a film-formable liquid composition containing a volatile component;
   (c) heating the liquid composition on the first release substrate to expel the volatile component, thereby forming a first porous film having a multiplicity of micropores on the first release substrate;
   (d) transferring the first porous film to a first surface of the first thermoplastic polyurethane film from the first release substrate and pressing the first porous film against the first thermoplastic polyurethane film while the first porous film is hot, thereby bonding thermally the first porous film to the first thermoplastic polyurethane film; and
   (e) cooling the first porous film,
   wherein the method further comprises
   forming a second porous film on a second release substrate under heat; and
   transferring the second porous film to a second surface of the first thermoplastic polyurethane film from the second release substrate and pressing the second porous film against the first thermoplastic polyurethane film so that the second porous film is thermally bonded to the first thermoplastic polyurethane film.

2. The method of claim 1, wherein the first thermoplastic polyurethane film and the first porous film on the first release substrate are advanced to a roller pressing device to perform step (d).

3. The method of claim 1, wherein said first porous film includes a polymer selected from the group consisting of polyurethane, and an acrylic polymer.

4. The method of claim 1, wherein said first release substrate includes polyethylene terephthalate.

5. A method of making a breathable film laminate comprising:
   (a) providing a first thermoplastic polyurethane film;
   (b) applying to a first release substrate a layer of a film-formable liquid composition containing a volatile component;
   (c) heating the liquid composition on the first release substrate to expel the volatile component, thereby forming a first porous film having a multiplicity of micropores on the first release substrate;
   (d) transferring the first porous film to a first surface of the first thermoplastic polyurethane film from the first release substrate and pressing the first porous film against the first thermoplastic polyurethane film while the first porous film is hot, thereby bonding thermally the first porous film to the first thermoplastic polyurethane film; and
   (e) cooling the first porous film,
   wherein the method further comprises
   forming a second porous film; and
   thermally bonding the second porous film to a second surface of the first thermoplastic polyurethane film.

6. The method of claim 5, wherein the first thermoplastic polyurethane film and the first porous film on the first release substrate are advanced to a roller pressing device to perform step (d).

7. The method of claim 5, wherein said first porous film includes a polymer selected from the group consisting of polyurethane, and an acrylic polymer.

8. The method of claim 5, wherein said first release substrate includes polyethylene terephthalate.

9. A method of making a breathable film laminate comprising:
   (a) providing a first thermoplastic polyurethane film;

(b) applying to a first release substrate a layer of a film-formable liquid composition containing a volatile component;

(c) heating the liquid composition on the first release substrate to expel the volatile component, thereby forming a first porous film having a multiplicity of micropores on the first release substrate;

(d) transferring the first porous film to a first surface of the first thermoplastic polyurethane film from the first release substrate and pressing the first porous film against the first thermoplastic polyurethane film while the first porous film is hot, thereby bonding thermally the first porous film to the first thermoplastic polyurethane film; and (e) cooling the first porous film, wherein the method further comprises forming a multi-layered structure having at least one second thermoplastic polyurethane film and at least one second porous film; and bonding thermally the multi-layered structure to a second surface of the first thermoplastic polyurethane film, wherein the second porous film is bonded to the second surface of the first thermoplastic polyurethane film.

10. The method of claim 9, wherein the first thermoplastic polyurethane film and the first porous film on the first release substrate are advanced to a roller pressing device to perform step (d).

11. The method of claim 9, wherein said first porous film includes a polymer selected from the group consisting of polyurethane, and an acrylic polymer.

12. The method of claim 9, wherein said first release substrate includes polyethylene terephthalate.

* * * * *